United States Patent [19]

Fuller et al.

[11] 4,375,613

[45] Mar. 1, 1983

[54] ELECTRICAL CONTROL CIRCUIT

[76] Inventors: Paul Fuller, 29 Homeway, Harold Park, Romford, Essex; Roderick W. Froud, 2 Wesley Ter., Chester-le-Street, County Durham, both of England

[21] Appl. No.: 61,127

[22] Filed: Jul. 26, 1979

Related U.S. Application Data

[63] Continuation of Ser. No. 860,329, Dec. 14, 1977, abandoned.

[30] Foreign Application Priority Data

Dec. 14, 1976 [GB] United Kingdom ............... 52039/76

[51] Int. Cl.$^3$ .......................... H02P 1/42; H02P 1/44
[52] U.S. Cl. ...................................... 318/786; 318/785
[58] Field of Search ................. 307/32; 318/431, 474, 318/513, 434, 476, 786, 787, 778, 785

[56] References Cited

U.S. PATENT DOCUMENTS

| | | | |
|---|---|---|---|
| 3,307,093 | 2/1967 | Wright .................................. | 318/786 |
| 3,538,411 | 11/1970 | Knauer et al. ....................... | 318/787 |
| 3,740,631 | 6/1973 | Fricker et al. ....................... | 318/787 |
| 3,882,364 | 5/1975 | Wright et al. ........................ | 318/786 |

Primary Examiner—J. V. Truhe
Assistant Examiner—Eugene S. Indyk
Attorney, Agent, or Firm—Biebel, French & Nauman

[57] ABSTRACT

The present invention concerns electrical control circuits which are particularly applicable to use and controlling the starting of electric motors. The invention thus provides a sensing and switching circuit capable of automatically to bring into and out of operation the start winding of an electric motor at appropriate motor speeds. Appropriate means sense a voltage or current level and a trigger response to the sensed value to supply firing pulses to the gate of a triac. The trigger element is preferably an M.O.S. integrated circuit multivibrator.

2 Claims, 6 Drawing Figures

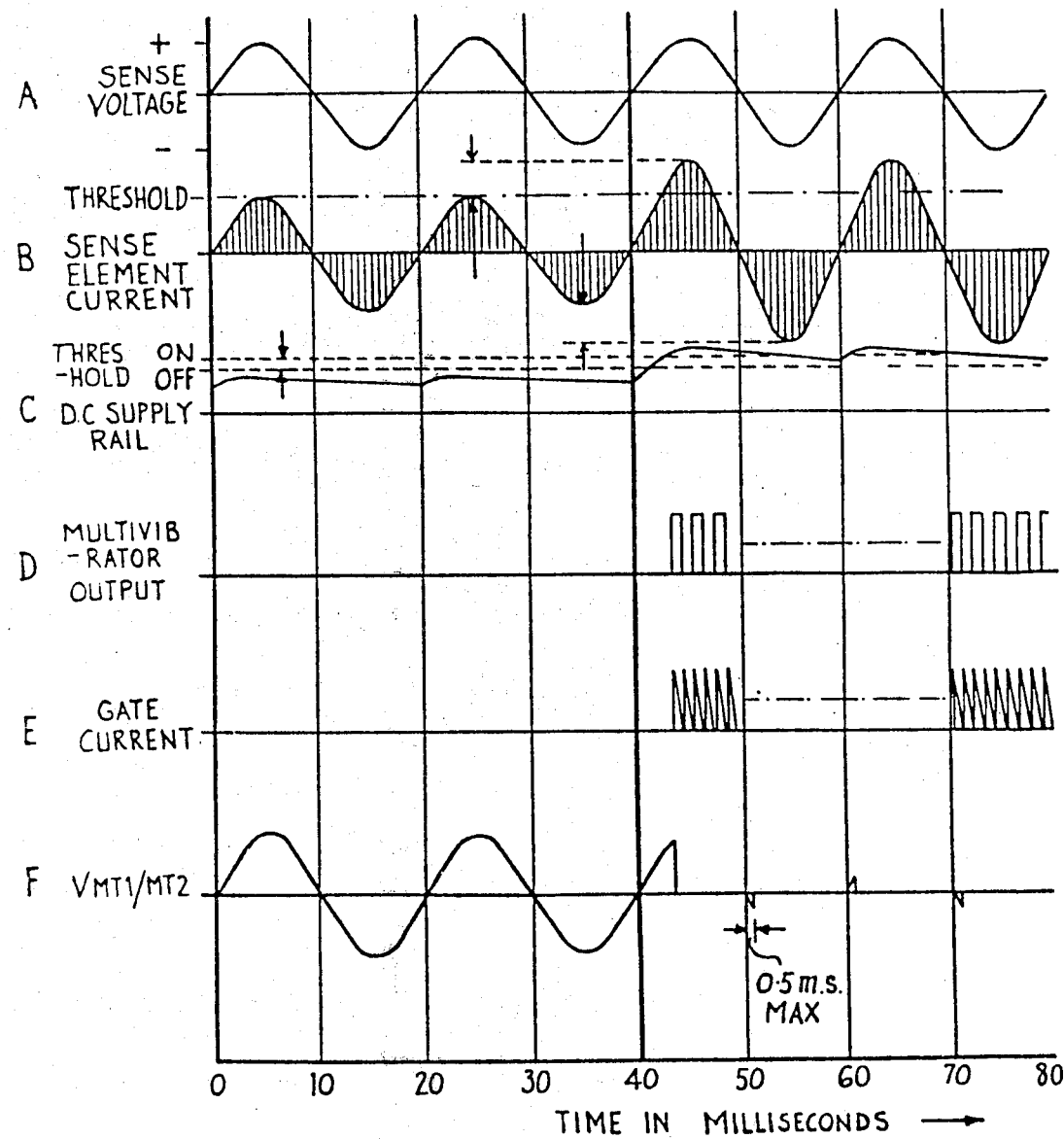

ELECTRICAL CONTROL CIRCUIT

This is a continuation of application Ser. No. 860,329, filed Dec. 14, 1977 now abandoned.

BACKGROUND OF THE INVENTION

The present invention concerns electrical control circuits and is particularly concerned with a circuit which can sense a current or voltage and switch another circuit in response to the sensed parameter.

Such a control circuit is particularly applicable to use in controlling the starting of electrical motors. When an electric motor is started from rest, sufficient torque must be exerted to overcome static and inertial forces of the motor and its load.

In order to achieve high power, and because of physical size limitations, a winding sufficient to provide adequate starting cannot be continuously rated. As this high start torque is required for a short period only at switch on, motors are constructed both with a continuously rated run winding, capable of supplying sufficient torque under normal running conditions, and a short term rated start winding.

It is thus necessary to provide a sensing and switching circuit capable automatically to bring into and out of operation the start winding at appropriate motor speeds. Previously this has been done by electromechanical devices. However, these are liable to corrosion, breakdown or mechanical failure. Thermal sensors have also been used, and have the disadvantage that they require a relatively long reset period. Examples of this latter type of arrangement is disclosed in U.K. Patent Specifications Nos. 1,451,380 and 139,173 in the name of Texas Instruments Inc. An alternative arrangement in which motor characteristics are sensed is disclosed in U.K. Patent Specification No. 1,352,367 in the name of Franklin Electric Co.

SUMMARY OF THE INVENTION

The present invention has for an object to provide an electrical control circuit which has the following advantages over the prior art; namely:

(a) accurately defined trip level
(b) simple preset adjustment of trip level, externally accessible if required
(c) all component tolerances accommodated by the same preset potentiometer for resistor 14 as used for setting of trip level
(d) complete range coverage 0.2 amperes to 4.0 amperes, is accomplished by the use of one standard control module with one of the appropriate current sensing elements added.

The circuit may be encapsulated, and the sensing of element may be added subsequent to the encapsulating process thereby permitting manufacture of only one standard module. The purchaser may therefore stock only the one standard item and solder in the appropriate sensor as and when required.

(e) currents of greater than four amperes may be catered for provided that the appropriate power dissipation of the current sensor is acceptable
(f) low hysteresis. (Typically one-third of that of the electromechanical devices)
(g) contactless power switching
(h) may be operated in any position
(i) high reliability coupled with high life expectancy
(j) integral current surge protection
(k) trip level threshold determined by variation of the M.O.S. integrated circuit supply rails
(l) directly interchangeable with existing electromechanical devices
(m) radio frequency interference (R.F.I.) lower than that of electromechanical devices
(n) may be used for any application where current sensing coupled with auxiliary circuit switching is required.

BRIEF DESCRIPTION OF THE DRAWINGS

In order that the present invention may be more readily understood, embodiments thereof will now be described by way of example, and with reference to the accompanying drawings, in which:

FIG. 6 is a wave timing diagram.

Figure 1:
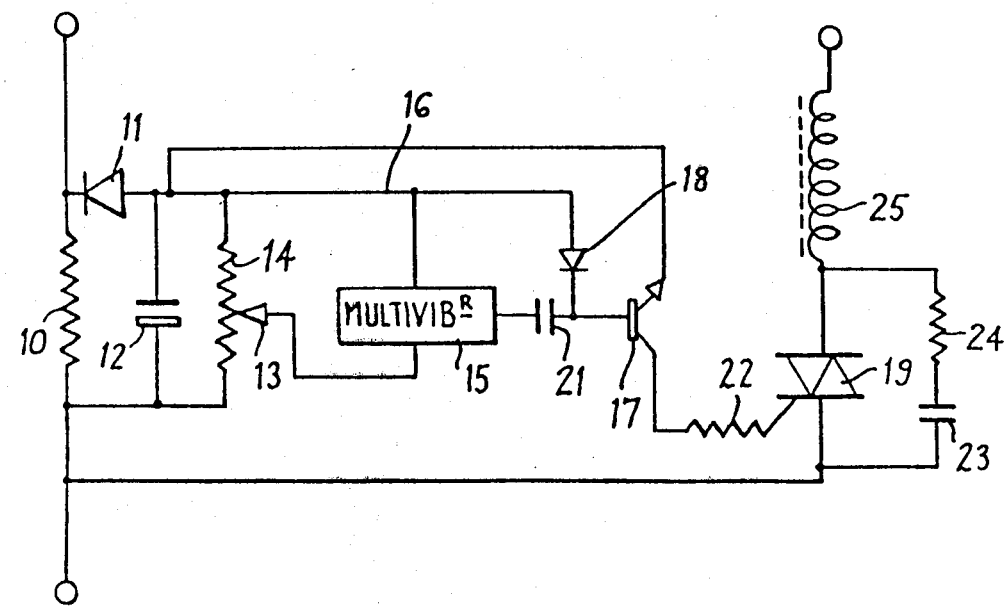
FIG. 1 is a circuit diagram of one embodiment of an electrical control circuit according to the present invention for use with an electric motor having start and run windings.
Figure 2:
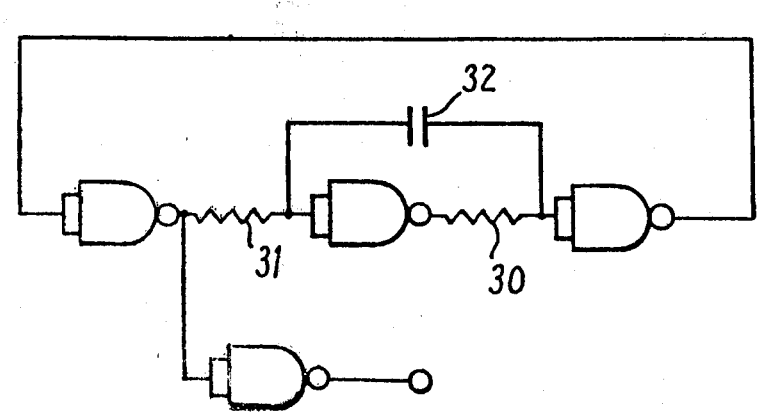
FIG. 2 is a circuit diagram showing in greater detail a multivibrator used in the embodiment of FIG. 1, FIGS. 3, 4 and 5 are circuit diagrams showing various configurations in which the circuit of FIG. 1 may be used.

The electrical control circuit shown in FIG. 1 is for use in controlling an electric motor having run and start windings. As the motor is entirely conventional it will not be described.

The current in the run winding of an electrical motor is inversely related to the speed of the motor. Thus when the motor is stationary, the run winding current is a maximum, and when the motor is at full speed, the run winding current is at a minimum.

The circuit shown in FIG. 1 is arranged to detect a predetermined run winding current, corresponding to a particular motor speed, and to switch in or out power to the start winding of the motor as appropriate.

The circuit shown comprises a resistor 10 which, in operation, is connected in series with the run winding of an electric motor.

With regard to circuit shown in FIG. 1, it will become apparent that for a very wide range of motor sizes the resistor 10 is the only variable in the system as the choice of value and power rating of resistor 10 will be dependent on the current which the run winding of the motor draws. The rating should be calculated using the maximum continuous current of the main run winding, measured with the motor fully loaded at plus 10% supply voltage. The stall current may be ignored in the calculations, as the operation period in stall condition is very short. A diode 11 rectifies the voltage which appears across resistor 10, this voltage thus being directly related to the current flowing in the run winding. When the motor is running capacitor 12 will charge to the peak value of the voltage across resistor 10 minus the voltage drop across diode 11.

The normal operating current supplied by diode 11 is a pulse train at a maximum frequency of approximately 4 Khz; pulse width 10 microseconds; peak current 100 mA. However the initial diode current at turn on may be high, since capacitor 12 may be completely discharged, at the moment of turn on.

Capacitor 12, which acts as a reservoir capacitor, must be of such a value as will maintain the d.c. level with maximum acceptable decay through the non-conducting half cycle of diode 11 while firing pulses are supplied to a triac as will be subsequently described. A suitable capacitor would have a capacitance of 470 mfd. at 6.3 volts d.c. working. The capacitor voltage will also be slightly influenced by the current drawn by the firing circuit which is to be described hereinafter. Nevertheless the voltage V12 of capacitor 12 will be dependent on and vary with the peak value of the current in the run winding.

A tapping 13 of a potentiometer 14 connected across capacitor 12 is connected to one input of a multivibrator 15, which has a second input connected to a line 16 one end of which is connected to the anode of diode 11 and the other end of which is connected to the base of a transistor 17 via a diode 18.

The potentiometer 14 is a miniature preset resistor and allows the tolerances of the resistor 10, diode 11 and multivibrator 15 to be catered for and provides an adjustable switching level within the peak value across resistor 10. Potentiometer 14 also provides a discharge path which determines the overall turn off response time of the control circuit.

Multivibrator 15 is an M.O.S. integrated circuit with four two input NAND gates. The NAND-gates are connected to resistors 30, 31, and capacitor 32 which together determine the frequency and mark space ratio of the multivibrator.

Typical values for the components of multivibrator 15 are:
Resistors 30, 31: 10,000 ohms @ ¼ watt
Capacitor 32: 0.0022 mfd. 20 v wkg The minimum usable trip level of the device is dictated by the sum of, the collector emitter saturation voltage of transistor 17 and the maximum gate/MT1 voltage of the triac 19. The sense element 10, is calculated to provide a sufficient supply voltage, at minimum trip current to ensure at least 50 m.a. of drive to the gate of triac 19 at triac switch on. The triac 19 is the main circuit switch and is triggered as early as possible in every half cycle of the supply to which it is connected by gate pulses from transistor 17 when the run winding current has reached the predetermined level set by the trip level of multivibrator 15.

When the motor is started, the initially high current in the run winding is detected by the circuit formed by resistors 10, 14, capacitor 12 and diode 11 and as soon as the trip voltage of multivibrator 15 is exceeded it delivers square wave pulses to a capacitor 21. Capacitor 21 differentiates the output of multivibrator 15 and provides a drive of short pulses of ten microsecond average duration into the base of transistor 17, this capacitor having a typical value of 0.0022 mfd. 20 v working. The base of transistor 17 is clamped by diode 18.

The transistor 17 is a silicon transistor which amplifies the differentiated pulses from multivibrator 15 to provide adequate circuit drive to the triac gate. The object of this differentiator circuit is to reduce the current drawn from the power supply and hence allow the use of a smaller capacitor 12 than would otherwise be required. On receipt of the differentiated pulses the transistor 17 delivers amplified current pulses at a minimum frequency of 2.5 Khz to the gate electrode of triac 19 via a current limiting resistor 22.

This minimum frequency means that the gate of triac 19 receives a firing pulse at an absolute maximum time lapse of 0.5 milliseconds after the start of either a negative or positive half cycle excursion of the terminal voltage of triac 19.

The circuit shown in FIG. 1 also includes a "Snubber circuit" consisting of capacitor 23 and resistor 24 connected in parallel with triac 19. This circuit prevents triac breakover caused by line transients, but more important it assists in the initial attainment of the triac minimum holding current required. This can be a problem when firing in the very early part of any cycle into an inductive load. Connected in series between the triac 19 and the motor start winding is a ferrite assembly 25 which is normally optional but must be used to prevent triac damage when the circuit described herein is used in conjunction with motors of the capacitor start and capacitor start-run heavy start variety.

In a typical example the ferrite assembly 25 comprises a standard ferrite with 103 turns of 26 swg enamelled cooper wire in two layers.

It should be noted that tracks for all high current paths in the circuit described are routed direct from the source rather than from other supply lines which may have appeared more convenient.

It will be appreciated that the control circuit described herein can be used with many classes of fractional horsepower induction motors, although of course it is not soley limited to this kind of use.

Figure 3:
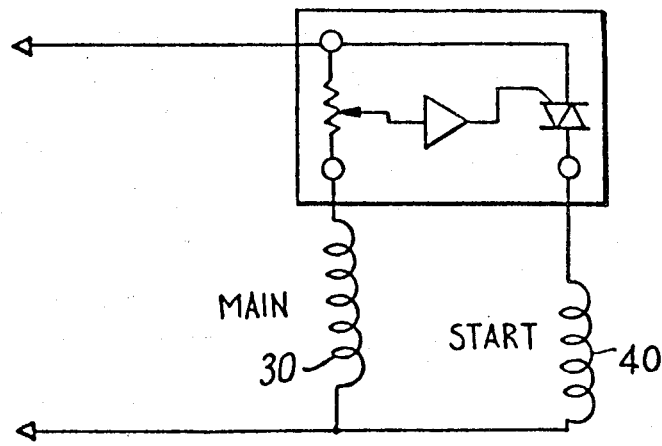
Figure 4:
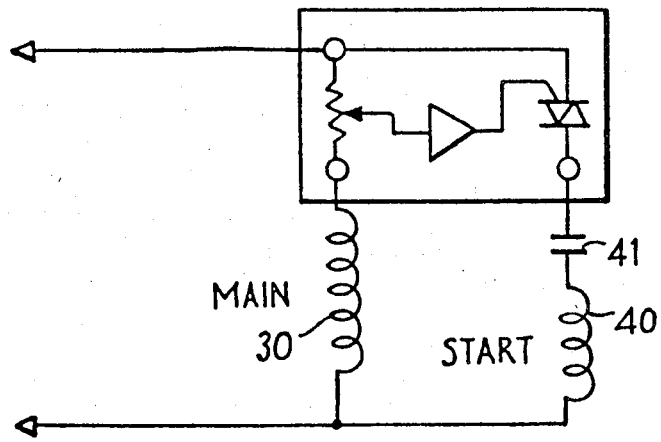
Figure 5:
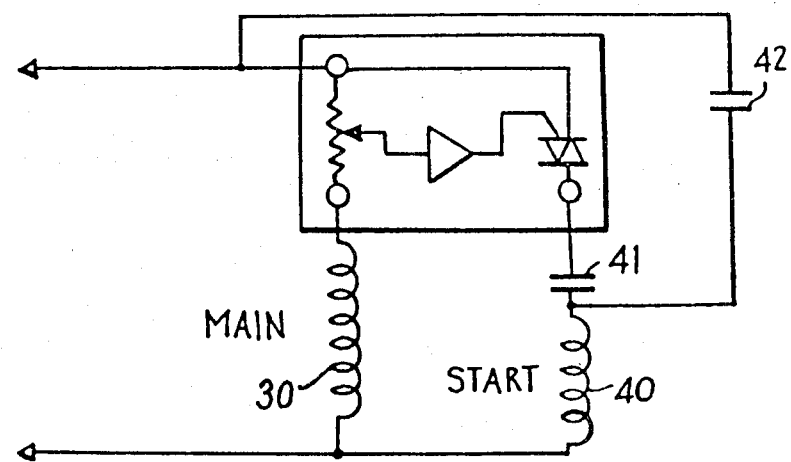

Thus FIGS. 3, 4 and 5 of the accompanying drawings show various classes of motor configuration with which the control circuit of FIG. 1 may be used. In these Figs. the run winding of an electric motor is indicated at 30, and the start winding at 40. FIG. 3 shows a split phase arrangement.

In the capacitor start arrangement of FIG. 4 an additional capacitor 41 is connected in series between triac 19 and the start winding 40, whilst FIG. 5 shows a capacitor start/run/heavy start arrangement, in which a still further capacitor 42 is connected in parallel with the control circuit between the power supply and the start winding 40.

We claim:
1. In a circuit arrangement for use with electric motors having a start winding and a run winding and comprising
    (a) sensing means having an output and operative to generate a control signal at said output in response to the flow of current in said run winding,
    (b) threshold means responsive to said control signal to generate a firing signal in response to said control signal exceeding a predetermined threshold, and
    (c) means connected to said threshold means so as to be responsive to said firing signal and operative to control the supply of current to said start winding, the improvement wherein said threshold means comprises an MOS integrated circuit multivibrator operative to generate said firing signal as a pulse train, said output of said sensing means being connected to the supply inputs of said multivibrator whereby said threshold is defined by the inherent switching characteristics of said multivibrator.
2. A circuit arrangement according to claim 1 wherein said means responsive to said firing signal comprises a semi-conductor device having a gate electrode, and further including:
    (a) differentiating means operative to differentiate the train of pulses generated by said multivibrator,
    (b) a transistor to the base of which the output of said differentiating means is connected, said transistor being connected to said gate of said semi-conductor switching device.

\* \* \* \* \*